Aug. 19, 1958  C. J. DUDZIK ET AL  2,847,900
METHODS AND APPARATUS FOR CHECKING STRAIGHTNESS OF BORES
Filed Feb. 8, 1956  4 Sheets-Sheet 1

INVENTOR.
Chester J. Dudzik
Bayard E. Quinn
BY
W. E. Thibodeau & A. W. Lew
ATTORNEYS

*INVENTOR.*
Chester J. Dudzik
Boyard E. Quinn

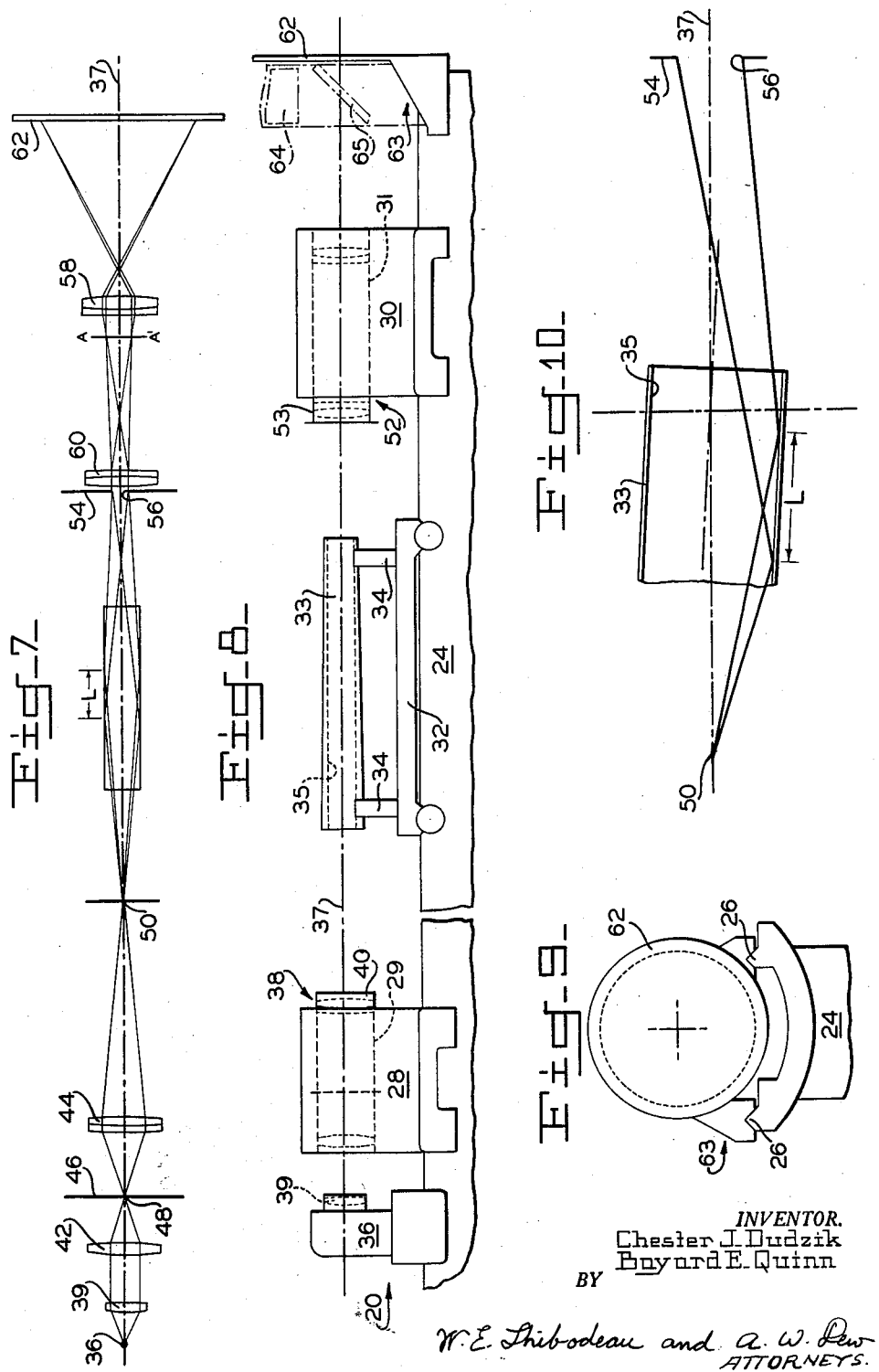

United States Patent Office 2,847,900
Patented Aug. 19, 1958

2,847,900

METHODS AND APPARATUS FOR CHECKING STRAIGHTNESS OF BORES

Chester J. Dudzik, Cranston, R. I., and Bayard E. Quinn, West Lafayette, Ind., assignors, by mesne assignments, to the United States of America as represented by the Secretary of the Army Application February 8, 1956, Serial No. 564,333

5 Claims. (Cl. 88—14)

This invention relates to means and methods of checking the straightness of a bore and more particularly to means and methods based on optical principles of checking the straightness of the bore of a firearm barrel and of measuring any deviations thereof from axial alignment.

Various methods have been devised for measuring the bore straightness of gun barrels. Some of these methods are more easily applied to the measurement of short barrels, such as for pistols, while others can be more conveniently applied to longer barrels, such as for rifles and machine guns. Some of these methods, also are applicable only to smooth bore barrels.

One method of measuring the straightness of the bore of a barrel is commonly referred to as "line straightening." This method is based on the reflection of a straight index line along the longitudinal surface of the bore. If the bore is not straight, the image of this line will be wavy, the amount of waviness being a measure of the straightness. This method, however, is qualitative since it does not indicate the amount of bend in the barrel. This method, too, requires considerable experience by the operator.

In "line straightening," too, the measure obtained is along a plane formed by the index line and the reflection thereof. In order to get measurements along other planes, the barrel must be rotated.

Another method for measuring bore straightness depends upon the measurement of relative bore slope. By this method a plug provided with a surface mirror on the front end is inserted into the bore of the barrel and the barrel then drawn over it. An autocollimator projects a cross onto the mirror surface of the plug which is reflected onto a screen. As the barrel is drawn over the plug, the plug assumes a position in the bore in accordance with the slope of the barrel section in which the plug lies. The light beam is, therefore, reflected onto the screen at an angle which depends upon the slope of the barrel section.

It is difficult to measure directly the slope of light beam, and for this reason, the reflected beam is projected on the screen in the shape of a cross. Since the position of the screen relative to the mirrored plug is fixed, the slope of the bore is determined by the position of the reflected cross relative to a fixed predetermined position on the screen. Readings of the slope are obtained directly from markings on the screen. The determination of the bore deflection curve of a barrel from slope measurement, however, is tedious since deflection is a mathematical integral of slope. In order to get a measurement of deflection of a barrel, one must first plot a curve of slope versus barrel position in two definite planes. Each curve must then be integrated and the combined result determined. This is a time-consuming job and, therefore, limits the practicality of using this method. Moreover, because the plug, which is slidable inside the bore, has an appreciable length this method can only be used for examining relatively long barrels.

The "drop-plug" method is another procedure used for measuring the bore straightness of gun barrels. This is a mechanical method and uses an accurately measured straight rod of fixed length and diameter. The rod is moved into the barrel very slowly and carefully. If the rod passes through the barrel without binding in any place along the length thereof, the barrel is considered to be straight. If the rod binds, the barrel is considered to be bent.

The tolerances of the bend are set by fixing the diameter and length of the rod. For example, if a deflection of .003 in. over a 12 in. length is considered permissible, the operator would use a plug 12 in. long with a diameter equal to the bore diameter minus .003 in.

There are objections to the use of this method. One is that the plug may be bent in handling and, therefore, gives erroneous results. The force that various operators exert on a plug in passing it through the barrel may also affect the result as a large enough force will cause the rod to bend inside the barrel bore and assume bore shape. Also, any burrs or roughness in the bore surface would give a faulty indication.

Another objection is that a series of different diameter rods are required to test one type of barrel because of the tolerances permitted in manufacture.

The most serious objection to this method, however, is that even though barrels are accepted or rejected, nothing is known about the actual deflection or slope within the limit established by the plug.

It is, therefore, the specific object of this invention to provide means and methods of checking the straightness of the bore of a gun barrel which is based entirely upon optical phenomenon.

It is another object of this invention to provide optical means and methods of simultaneously checking the straightness of the bore of a gun barrel and the concentricity of the ends of the bore with the true axis thereof.

It is a further object of this invention to provide optical means and methods of measuring the deviation of a portion of the bore of the gun barrel from the axial alignment thereof.

It is a still further object of this invention to provide means and methods of checking sectional portions of the bore of the gun barrel in variable increments along the length thereof.

It is also an object of this invention to provide a method of checking the straightness of the bore of a barrel whereby such bore is probed by a beam of light and the resulting image received directly by the human eye or projected onto a screen.

It is another and still further object of this invention to provide means and methods of checking the alignment of the bore of the gun barrel which is not affected by burrs or surface roughness of the bore.

It is still another and further object of this invention to provide means and methods of checking the straightness of the bore of a gun barrel of any size, and whether smooth or rifled.

The specific nature of the invention as well as other objects and advantages thereof will clearly appear from a description of a preferred embodiment as shown in the accompanying drawings in which:

Fig. 7 is a diagrammatic view of the optical system of the apparatus of the invention;

Fig. 8 is a longitudinal view of the apparatus of the invention;

Fig. 9 is an end view of the apparatus of the invention showing the screen element;

Fig. 10 is a schematic longitudinal view of the slope portion of a gun barrel showing the effect of the slope on the reflecting areas in the bore and the relationship between the optic axis and the reflecting areas;

Fig. 15 is an end view of the diaphragm with an adjustable orifice therein; and

Fig. 16 is a view similar to Fig. 15 but with the diaphragm provided with variable sized orifices.

Optical methods are favored in measuring the straightness of the bore of gun barrels for a number of reasons. The primary reason is that in a given medium, a light ray is perfectly straight and is not deviated by mass, wind, shock, etc., regardless of the length of the ray. Also, small values of slope change can be recorded by reflecting a ray of light from a body which tilts. This is accomplished by intercepting the reflected ray at a considerable disance from the object, thereby magnifying the effect of the small angle on the screen.

Another important reason is that light, when reflected from a body, can, under favorable conditions, reproduce an image of the body. Thus, by observing images of the body under different conditions, one may relate the image changes to the components which effect the changes. Lastly, the amount of light reaching a surface may be controlled by placing a barrier before the unwanted light without introducing any additional force. In this way the location from which the light is reflected can be controlled quite accurately.

Figure 1:
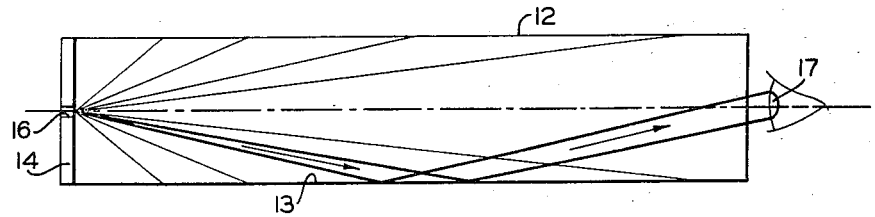
Fig. 1 is a schematic longitudinal view of the bore of a tube showing light from a hole in one end of the bore being reflected a single time from the surface of the bore to the eye at the opposite end.

The principle of the present invention can best be shown by the use of a tube, such as 12 in Fig. 1, having a smooth surface bore 13 with a plug 14 fixed in one end. A hole 16 is drilled in the center of this plug to form a point of entrance for light so that, when the tube 12 is tilted toward a light source, it will appear as though hole 16 is a source of light.

The light rays passing through hole 16 enter bore 13 in a random fashion, as shown in Fig. 1. However, when a person looks into the open end of the tube, the size of the iris of the eye, noted at 17, fixes the amount of reflected light that enters thereinto and the location of the iris relative to hole 16, fixes the position along the surface of bore 13 from which the reflected light is observed. For single reflection, in the plane of the paper, the rays which will pass through iris 17 are illustrated by solid, dark lines reflected from the bottom surface of bore 13. Actually, these rays are reflected from an annular section of bore 13 hereinafter referred to as "measuring area L" and are determined by applying the law of reflection which is, namely, that a light ray is reflected from a plane surface with the angle of reflection being equal to the angle of incidence. The cone of light, which passes through iris 17, is shown by arrows within dark lines.

Figure 2:
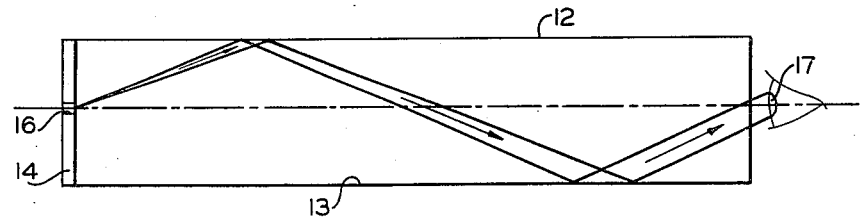
Fig. 2 is similar to Fig. 1 but showing the light reflected twice from the surface of the bore before being received by the eye.

It is also possible, as shown in Fig. 2, for the ray that reaches the eye to have been counterreflected from the surface of bore 13 several times during passage from hole 16 to iris 17.

The images received by iris 17 from the reflecting surfaces and which appear to be rings of light spaced along bore 13, are concentric if the bore is straight, as the reflecting surfaces in the bore lie in the same plane. These rings, too, appear to have a width equal to the diameter of hole 16 because they are produced by a pure reflection from a singly curved surface.

Figure 3:
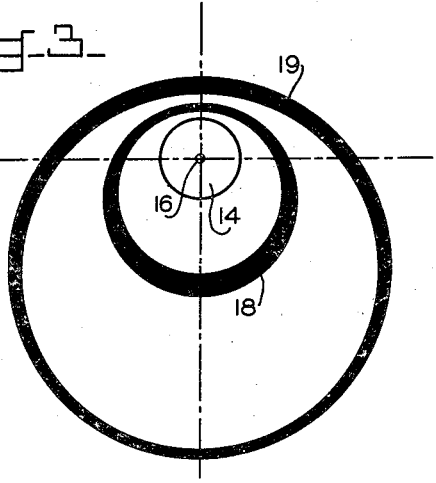
Fig. 3 is an end view of the tube showing the effect upon the reflecting areas of light in the bore when the tube is bent.
Figure 4:
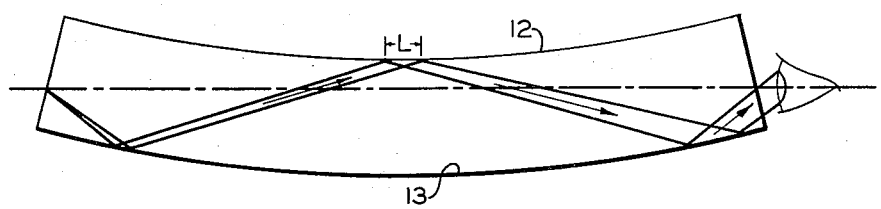
Fig. 4 is a schematic longitudinal view of the bent tube of Fig. 3 showing the positions of the reflecting areas along the bore.

When tube 12 is bent, the image seen by looking into the end of the tube undergoes significant changes, with the resulting image for a single bend appearing as shown in Fig. 3.

Here, the single-reflection ring 18 has changed shape slightly and the center has dropped a distance below the center of bore 13. This drop is equal to the deflection of tube 12 at approximately the center of measuring length L. Also, the bottom part of ring 18 is seen to broaden while the upper portion of the ring becomes narrow. This broadening and narrowing, as shown hereinafter, are functions of the amount and type of bend in the section of bore 13 from which light from hole 16 is reflected to form this image.

The double-reflection ring 19, also, is seen to move downward, and the top of the ring broadens very slightly while the bottom becomes slightly narrower. A drop in intensity of ring 19, as compared to single-reflection ring 18, is also noted. This is due to the fact that the surface of bore 13 is not a pure reflecting surface, and so a loss in intensity results with each reflection.

The changes in the image noted above are due to the fact that the reflecting surfaces of bore 13 are not displaced equally about the line formed by hole 16 and the center of the iris 17. Thus, by observing an image such as this in the bore of a tube, one can observe the effect of the bend. One cannot, however tell from this image where and how the tube is bent.

In order to locate the position and type of bend, one must be able to determine from where and the way the image is formed. Otherwise the information obtained is of no value.

Figure 5:
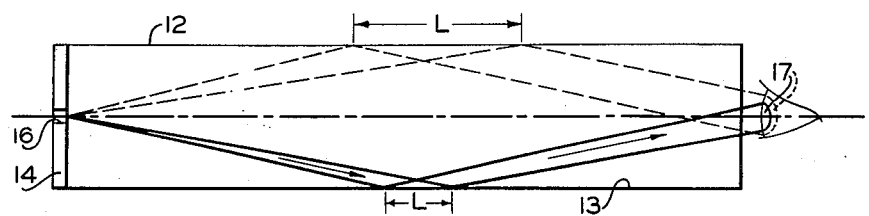
Fig. 5 is a schematic longitudinal view of a straight tube showing how the length of the area of reflection is affected by the size of the iris of the eye.

It was mentioned previously that the size of the iris 17 fixes the amount of reflected light that enters the eye. This is shown in Fig. 5 in the following manner: Iris 17 is shown in two sizes, the smaller size is drawn with a dark line and the larger size with a dotted line. For clarity, the image seen by the small iris is pictured as being reflected by the bottom of bore 13, while the image observed by the larger iris is pictured as being reflected by the top of the bore. It is obvious that the dotted cone of light has a larger angle than the solid cone and, thus, will produce a brighter, not larger, image. It can, thus, be said that for a given source of light at hole 16, the larger the iris 17 the brighter the observed image.

It should also be noted that the length of the area of bore 13 from which light is reflected from the top of bore 13 is longer than that which reflects the light from the bottom of the bore. It can then be stated that, other factors being equal, the size of iris 17 governs the length of the section of bore 13 over which reflection takes place and determines the length of measuring area L.

Figure 6:
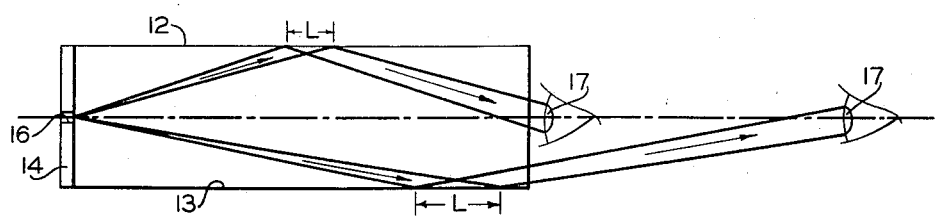
Fig. 6 is a schematic longitudinal view of a tube showing how the distance of the eye from the source of light affects the position of the reflecting areas along the bore.
Figure 1A:
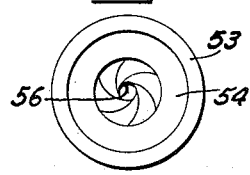
Figure 1B:
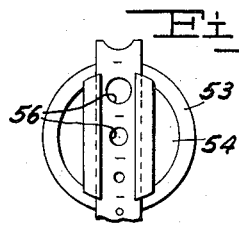

It was also mentioned previously that the location of iris 17, relative to hole 16, fixes the position of measuring area L along the surface of bore 13. This is shown in Fig. 6 where, in order that the effect of the position of iris 17 can be shown graphically, tube 12 is reduced in length and iris 17 is shown in two positions, one close to tube 12 and the other away from it. The size of the irises 17, in each of the two positions, is the same. For clarity, the reflected light passing through the two irises 17 is drawn from different surfaces of the tube.

It is obvious that the position of measuring area L utilized by the farther one of irises 17 is different from that utilized by the closer one of such irises. The measuring areas L are, however, approximately centrally located between hole 16 and iris 17. It can then be said that the position of measuring area L along bore 13 is governed by the position of iris 17 relative to hole 16 and is approximately centrally located therebetween.

However, if different persons viewed the same bent tube, they would observe different images. This is due to the fact that their irises respond differently under the same light conditions. That is, the iris of one person's eye may open more than that of another's to observe light from the same source. Also, different observers would hold the tube at different distances from the eye to focus upon the measuring area L, thus, introducing other factors that influence the type of image and the position along the tube from which it is formed.

For these reasons, an instrument 20 is provided which can control the factors that affect the image. The principal factors are those that affect the formation, the size, and the brightness of the image. Instrument 20 is comprised of a base member 24 having a pair of parallel ways 26 disposed longitudinally along the top thereof. Ways 26 are accurately machined for straightness and are to be more than twice the length of the barrels to be inspected, for the reasons hereinafter explained.

Slidably mounted on ways 26 is a projecting lens tube head 28 and a receiving lens tube head 30. The heads 28 and 30 are provided with bores 29 and 31, respectively, which are machined for accurate, parallel relationship with ways 26 and for axial alignment with each other. A barrel carriage 32 is mounted on ways 26, between head members 28 and 30, for slidable movement therebetween. Barrel carriage 32 is provided with a pair of adjustable barrel supports 34 which are adapted to support barrels 33 of various dimensions adjacent the ends of axial alignment of a bore 35 therethrough with the axis of the bores of head members 28 and 30.

Mounted to projecting lens tube head 28 on the far side thereof from barrel carriage 32 is a light source 36 which is comprised of a zirconium arc inclosed in an argon-filled gas bulb which makes a stable and intense source of light. Such arc is arranged to be centered on the optic axis, noted at 37 in Fig. 7, of the instrument which is coincident with the geometric axis of bores 29 and 31. The rays from source 36 are made parallel by a collimating lens 39.

Replaceably mounted in bore 29 of projecting lens tube head 28 is a projecting lens tube assembly 38 comprised of a tube 40, which is accurately machined so as to be snugly received by such bore, a lens 42 inclosing one end of such tube, a lens 44 inclosing the other end of such tube and a diaphragm 46 which is provided with a central aperture 48 and is mounted between such members parallel therewith. Lens 42 is a "collecting" lens and is arranged to project the light from light source 36, after straightened out by collimating lens 39, onto aperture 48 with diaphragm 46 blocking the remainder of the light. Lens 42, also, has a relatively short focal length whereby such lens may be located close to light source 36 without magnification thereof. Lens 44 projects and focuses the light that passes through aperture 48 to a focal point, noted at 50, located along optic axis 37 between such lens and the adjacent end of barrel 33 and distributes the light from such point along the surface of bore 35. Such point 50 is the functional equivalent of hole 16.

Replaceably mounted in receiving lens tube head 30 is a receiving lens tube assembly 52 comprised of a tube 53 which is accurately machined so as to be snugly received by bore 31, a diaphragm 54 mountable in one end of tube 53 and provided with a variable circular orifice 56 therethrough, a lens 58 mounted at the opposite end, and a lens 60 mounted therebetween. Orifice 56 is the functional equivalent of iris 17 and the diameter of such orifice, as previously pointed out, fixes the length of measuring area L, and the position of such orifice, relative to point 50, fixes the position of such measuring area between such point and such orifice. Lens 60 is the functional equivalent of the lens of the eye and produces an image at section A—A', shown in Fig. 7, from the light and so can be compared to the retina of the eye. The image at A—A', however, is inverted so lens 58 reverses the image to normal position while magnifying it and focusing it on a screen 62 of ground glass which is mounted, as hereinafter described, on ways 26. Screen 62 may be replaced with an eyepiece 64 and mirror 65, shown in phantom in Fig. 7, whereby the image may be viewed directly by an observer. This results in a more sensitive inspection as screen 62 loses or diffuses some of the characteristic formations in the image.

As instrument 20 is adapted to inspect barrels of various length, the focal plane of the image will change. Screen 62, therefore, is set on a support 63 which is mounted for slidable movement along ways 26 so as to be movable into focus for the different conditions. Screen 62 is also adjustably mounted to support 63 for movement in both the vertical and horizontal directions so that the center of such screen can be aligned with optic axis 37.

The accurate construction of instrument 20 guarantees the alignment of the optical elements of the system. The ends of barrel 33 must, however, be aligned with respect to optic axis 37 before the barrel can be examined. This is done with the aid of conventional telemicroscopes (not shown) which are mounted on head members 28 and 30. The telemicroscopes are actually telescopes with a short depth of field. A cross is mounted in the telemicroscopes and is focused along the optic axis 37, and a plug with a cross scribed on its center is set into the end of the barrel 33. Barrel 33 will then be moved toward one of the telemicroscopes. When the cross on the plug is in focus, barrel 33 will be adjusted in the one of supports 34 adjacent that end until this cross coincides with the cross in the telemicroscope. The center of this end of barrel 33 will then lie on optical axis 37. The same procedure will be followed for the other end of barrel 33 until the cross of the plug in each end coincides with those of the telemicroscopes. The ends of barrel 33 can, thus, be said to lie along the optic axis 37.

As has been hereinbefore explained, the section of bore 35 from which light is reflected through orifices 56, and which is referred to as the measuring area L of instrument 20, is located approximately midway between point 50 and such orifice, regardless of the location of barrel 33. Since it is desired that every section of bore 35 be inspected, the distance between point 50 and the diaphragm 54 must be at least twice the length of the barrel. Barrel 33, thus, can then be traversed between point 50 and diaphragm 54.

As ways 26, along which barrel 33 is traversed on barrel carriage 32, are machined to be accurately parallel to the optic axis of instrument 20, the barrel will always be in the same position relative to optic axis 37 when traversed. Thereby, errors are eliminated in the measurement due to traversing the barrel.

The similarity between instrument 20 and the method of visual observation, described hereinbefore, is obvious. Certain improvements, however, have been made. The orifice 56, which is functionally equivalent to iris 17, is fixed in size and in location relative to point 50. Thus, the image formed on screen 62 will be the same regardless of who looks at it. Also, the location from which the reflection occurs is known and is fixed even when barrel 33 is moved.

Because of the limited spacing between point 50 and orifice 56, it is impossible to reproduce completely the type of image formed when one looks into the tube. One can see the ring formed by the single reflection, and when the barrel is properly positioned, one may also see the ring formed by the double reflection. One will not, however, see the ring formed by a triple reflection or any reflections greater in number than this.

In order to project an image of the triple reflection on screen 62 or mirror 65, the distance between point 50 and orifice 56 must be small. This then would restrict the traversing of the barrel in the direction toward orifice 56. The limitation of forming only the single-reflection ring from any position along the barrel does not restrict instrument 20 in measuring bore straightness. As it has been pointed out hereinbefore, because of the reflective properties of gun barrels, multiple-reflection rings suffer a great loss in intensity. Therefore, even though available, the rings other than that of a single reflection would be difficult to examine. Consequently, the loss of these rings due to the nature of the optical system is no limitation.

Figure 12:
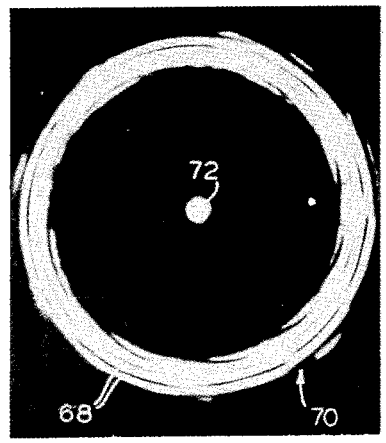
Fig. 12 is a reproduction of a photograph of the image intercepted on the screen of a rifled gun barrel bore which is straight.
Figure 13:
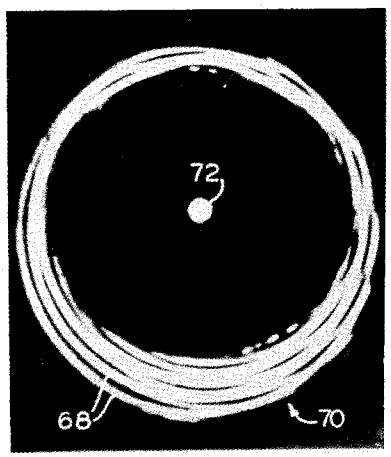
Fig. 13 is similar to Fig. 12 but showing the center of the gun barrel deflected downwardly .010 inch.
Figure 14:
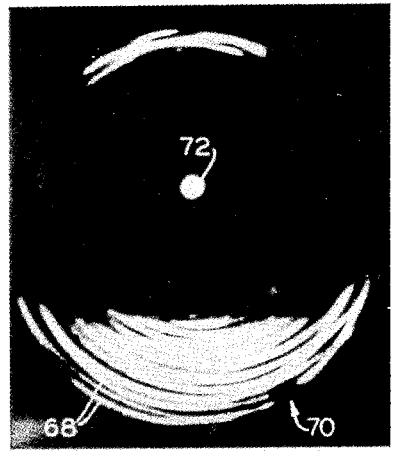
Fig. 14 is similar to Figs. 12 and 13 but showing the center of the gun barrel deflected downwardly .020 inch.

When bore 35 is rifled, and there is a bend in barrel 33, the effect on the image seen on screen 62 is shown by the photographs in Figs. 13 and 14. For comparison, Fig. 12 is a photograph of the image obtained from a relatively straight barrel, while Figs. 13 and 14 are photographs obtained from bent barrels. The photographs were taken at the center section of a 30 inch long caliber .60 test barrel. The barrel was loaded at its center and deflected downward first by .010 inch and then by .020 inch.

In Fig. 12 the reflection band, noted at 70, has a uniform width and a center point, noted at 72, which is produced by rays projected along the optical axis from aperture 48, is located in the center of this band. Noticeable in this image are 8 blurs which are approximately equally spaced about band 70 and a plurality of rings 68 produced by rays reflecting from the lands within measuring length L.

When barrel 33 is bent in the vertical plane to .010 inch, the image on screen 62 appears as shown by Fig. 13. It should be noticed that band 70 is no longer of uniform width as the bottom has become wider and the top narrower than the band seen in Fig. 12. The bottom of band 70 corresponds to the concave side of the bend in bore 35 while the top corresponds to the convex side. Band 70, also, is no longer symmetrical. The left side, too, is nearly void of blurs, nearly all appearing on the right side, and the "forks" in these blurs no longer lie along a radial line. A close observation of this photograph shows that both the center of the top and bottom bands have been displaced relative to center point 72. This center point, however, appears to lie in the center of the dark area inside the image.

The 0.020 inch deflection image undergoes still more significant changes, as shown in Fig. 14. The width of the top and bottom of band 70 changes still more in the same direction, that is, the bottom becomes wider while the top becomes narrower. The sides of band 70 disappear completely over quite an angular range. The blurs also disappear almost completely, having been in the region where the image disappears. The top of band 70 appears to consist of a series of crossed rings while the bottom consists of a series of not-too-well-defined concentric rings. Both the top and bottom portions of rings 68 have been displaced relative to the center point 72 and the density of the ring portions vary considerably along their lengths.

From the projected image on screen 62 or mirror 65, there may be determined the approximate radius of curvature of a bend in the bore 35 of barrel 33. This is done by observing the widening of the broadest part of band 70 and by counting the number of reflected lands or rings 68 inclosed within this region. Since measuring area L is a function of the radius of curvature, and the number of reflected lands is a function of the measuring length, one may relate the broadening of the image with the radius of curvature.

Figure 11:
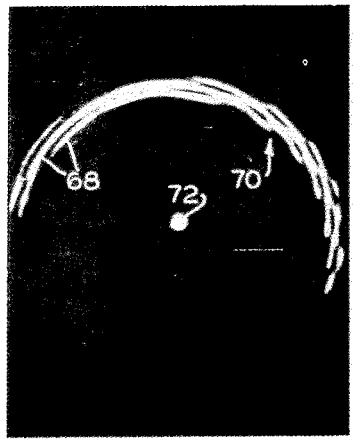
Fig. 11 is a reproduction of a photograph of the image resulting from the slope illustrated in Fig. 10 wherein the slope is so great that no reflection or image results from the lower half of the bore.

In Figs. 10 and 11, there is shown how a slope at the end of barrel 33 may be measured. As can be seen in Fig. 10, the bottom of area L is closer to one end of barrel 33 while the top of such area L is closer to the opposite end. Also, since the end of barrel 33 is being measured, the bottom of the measuring area L of Fig. 10 is shifted so far to the left that part of the bottom of the image disappears. One can obtain an approximation to the slope at the end of barrel 33 by measuring the distance from center point 72 to the center of the top of band 70. The difference between the radius of the image for the straight barrel and this distance is a measure of slope. From this information the approximate slope at the end of the barrel may be figured mathematically. The slope is approximate because, as shown in Fig. 10, the measuring area L of the top part of barrel 33 has moved slightly to the right. To obtain a more accurate measure of slope, barrel 33 is traversed, in this case, toward point 50 until the top part of band 70 also begins to disappear. Measuring area L is then at the very end of barrel 33 and so from the difference between the radii of band 70 at this point and the normal radii thereof a very close measure of the slope may be obtained mathematically. This value will be a true value, since at this point, because the end of barrel 33 has been aligned with a telemicroscope (not shown) as hereinbefore mentioned, the deflection is zero and measuring area L is at the end of barrel 33. It can thus be said that the slope at the end of barrel 33 can be measured to a fair degree of accuracy.

By scanning the broad and narrow portions of band 70, while barrel 33 is being traversed, there is indicated whether a slope in barrel 33 is positive or negative. It also gives an idea as to whether a bend in barrel 33 causes the slope or whether the slope is caused by the misalignment of a straight barrel. When barrel 33 is sloped due to a bend, band 70 broadens at the side corresponding to the concave side of the barrel, whereas when the barrel is straight, but misaligned, the band is very nearly of uniform width.

To measure deflection, barrel 33 is traversed until the width of band 70 is the greatest that occurs anywhere along the length of the barrel because, as was mentioned previously, the band experiences the maximum broadening in the region of maximum deflection. At the point of maximum deflection there is zero slope. Thus, the displacement of band 70 relative to the center point 72 is due entirely to the deflection of this section of barrel 33. One can, thus, obtain a measure of deflection by measuring the distance between the center of the narrow portion of band 70 and center point 72. Also, it can be seen that the sides of the band very nearly disappear. It can be said, therefore, that a deflection of .014 inch is the deflection at which the sides of the image disappear for the section of the barrel used in this embodiment, which is of .60 caliber type. Therefore, if an image is obtained in which the narrow and wide areas are separated, a deflection greater than .014 inch can be assumed under these conditions. This can be seen for the .020 inch deflection condition picture in Fig. 14. Maximum deflection limits can, thus, be set up in this manner.

If it is found desirable to shorten measuring area L for more exact location of the slope or deflection, this is accomplished, as explained hereinbefore, by adjusting orifice 56 to a smaller diameter. The resulting measuring area L will be, as hereinbefore stated, located approximately midway between point 50 and orifice 56. Therefore, the location of the slope and deflection is easily ascertained.

Burrs on the lands will produce minor diffraction patterns on the image of band 70 on screen 62 but do not affect the major pattern. Also, roughness of the reflecting surface of bore 35 produces some irregularity of the outer ones of the rings 68 making up band 70, but again without affecting the major pattern of such band and so the use thereof in checking for slope or measuring deflection. It has been found that this means of inspection is so sensitive that a deflection produced in the mounted barrel 33 by pressure of the hand alone is easily detected.

Operation

Instrument 20 may be used for measuring the straightness of any standard gun barrels. As has been shown, instrument 20 can measure the slope of the barrel at each end, and the location and magnitude of the maximum deflections. A slope can be obtained qualitatively at other positions along barrel 33 while a maximum deflection may be measured anywhere along bore 35. The following is the procedure that will be used for measuring the straightness of barrel 33 by the apparatus of this embodiment.

The optical system of instrument 20 must first be set up for the type of barrel that is to be measured. That is, the proper projecting and receiving lens tube assemblies 38 and 52, respectively, are selected for the barrel being checked and are mounted in their respective heads 28 and 30, as barrels of different lengths and bore dimensions require variations in the position of point 50 and size of orifice 56 and changes must be made in the powers and focal lengths of lenses 42, 44, 58 and 60. Heads 28 and 30 must then be moved along the ways to locate point 50 relative to orifice 56 for the desired position of measuring area L. The instrument is then ready for use.

Barrel 33 is mounted on carriage 32 and aligned with the optical system of instrument 20, as mentioned previously. Carriage 32 is then moved along ways 26 and the resulting image on screen 62 or mirror 65 is observed. If band 70 remains uniform in width and concentric with point 72 for all positions of measuring area L along bore 35, the bore is considered to be straight. If the image varies from this when barrel 33 is traversed, bore 35 is not straight.

By observing the changes that occur in the image on screen 62 or mirror 65, as barrel 33 is moved along ways 26 to traverse measuring area L along bore 35, a knowledge of the general shape of the bore may be obtained. When scanning the resulting image, it should be remembered that the plane of the bend is the plane that divides band 70 into two symmetrical sections and that the surface of bore 35 corresponding to the widest section of the band is concave in the plane of the bend, while the surface of such bore corresponding to the narrowest section of the band is convex. These sections should be 180 degrees apart on the image.

Also, the section of maximum deflection of bore 35 is that section which produces the maximum widening of band 70, when barrel 33 is moved. To narrow the limit of measuring area L, orifice 56 is adjusted to a smaller diameter. A deflection in bore 35 is measured by measuring the distance from center point 72 to the center of the narrow portion of band 70. The difference between the nominal radius of band 70 and this radius, taking the degee of magnification into account, is the deflection.

From the foregoing it is clearly apparent that there is herein provided novel means and methods of checking the straightness of a bore and particularly the bore of a gun barrel. It is also obvious that the means and methods of this invention are applicable to gun barrels of any length and whether smooth bored, or rifled. Also, the burrs or surface roughness in the bore are of little consequence.

Although a particular embodiment of the invention has been described in detail herein, it is evident that many variations may be devised within the spirit and scope thereof and the following claims are intended to include such variations.

We claim:

1. The method of checking the straightness of the bore of a gun barrel comprising the steps of introducing a diaphragm with an aperture of smaller diameter than the bore between a source of light and one end of the barrel, projecting rays of light from said source of light through said aperture and along the geometric axis of the bore, intercepting said rays projected along the geometric axis of the bore and said rays reflected from the surface of the bore by a screen at the opposite end of the bore to produce an image comprising a point of light produced by said rays projected along the geometric axis of the bore and a band encircling said point produced by said rays reflected from the area, varying the length of the area of the surface of the bore which reflects said rays from said aperture onto said screen by placing diaphragms having orifices of various diameters between said opposite end of the bore and said screen, and moving said orifice relative to said aperture for changing the position of said area along the bore whereby there is graphically represented on said screen a selected tubular portion of the bore in relationship to the geometric axis thereof.

2. The method of checking the straightness of the bore of a gun barrel comprising the steps of introducing a diaphragm with an aperture of smaller diameter than the bore between a source of light and one end of the barrel, projecting rays of light from said source of light through said hole and along the geometric axis of the bore, receiving on a screen at the opposite end of the bore said rays projected along the geometric axis of the bore and the rays reflected from the surface of the bore to a circular orifice centrally positioned relative to the opposite end of the bore to produce an image comprising a point of light produced by said rays projected along the geometric axis of the bore and a band encircling said point produced by said rays reflecting from said area and received by said orifice, varying the length of the area of the surface of the bore which reflects said rays passing through said orifice to graphically relate tubular areas of selected length of the bore to the geometric axis thereof by selectively changing the diameter of said orifice, and moving the barrel between said orifice and said aperture for traversing said area along the length of the bore to graphically relate incremental tubular portions of the bore along the length thereof to the geometric axis thereof.

3. An apparatus for checking the straightness of the bore of a gun barrel comprising aperture means for projecting rays of light into one end of the bore and along the axis thereof, lens means for distributing rays from said aperture means against the surface of the bore, a screen mounted adjacent the opposite end of the bore and in axial alignment therewith, a diaphragm disposed between said opposite end of the bore and said screen, an adjustable orifice in said diaphragm for selectively limiting the area of the bore reflecting said rays to said screen, and optical means for intercepting said rays passing through said orifice, enlarging the image formed by said intercepted rays and projecting said enlarged image onto said screen.

4. In the method of checking the straightness of the bore of a barrel by reflecting a cone of light along the bore and intercepting the reflected light to form an image of the tubular area of the bore reflecting the light and traversing the bore with the light to disclose the presence of any bend in the bore, the steps of interposing an adjustable orifice in the path of the reflected light between the barrel and a point of observation, opening said orifice wide to form relative to the point of observation a relatively long tubular area of light reflected from the bore and traversing the bore with said long tubular area of light to disclose at the point of observation any bend in the bore of long magnitude and slight angularity, reducing the size of said orifice to reduce the length of the tubular area of light and traversing the bore with said reduced area of light to disclose any bend in the bore of sharp angularity, and coordinating the adjustment of said orifice with the passage of the tubular area of light along the barrel to locate the point of zero deflection of any bend disclosed in the bore.

5. An apparatus for checking the straightness of the bore of a gun barrel comprising a source of intense and stable light, aperture means for projecting rays from said light source along the geometric axis of the bore to a point of observation, lens means disposed between said aperture means and one end of the bore for distributing a portion of the rays of light passing through said aperture means against the surface of the bore, a diaphragm slidable between the end of the bore and the point of observation parallel with the axis of the bore, and an adjustable orifice disposed through said diaphragm concentric to the axis of the bore for selectively determining the length of the tubular area of the bore reflecting the rays of light relative to the point of observation.

References Cited in the file of this patent

UNITED STATES PATENTS

| | | |
|---|---|---|
| 2,186,200 | McClain | Jan. 9, 1940 |

FOREIGN PATENTS

| | | |
|---|---|---|
| 220,792 | Germany | Apr. 12, 1910 |
| 701,172 | Germany | Jan. 10, 1941 |
| 705,962 | Germany | May 14, 1941 |
| 601,203 | Great Britain | Apr. 30, 1948 |